(12) United States Patent
Vasshus et al.

(10) Patent No.: US 10,427,072 B2
(45) Date of Patent: Oct. 1, 2019

(54) DEVICE FOR SEPARATING A MEDIUM COMPRISING A MIXTURE OF A SOLID PORTION AND A FLUID PORTION

(71) Applicant: Cubility AS, Sandnes (NO)

(72) Inventors: Jan Kristian Vasshus, Sandnes (NO); Arne Malmin, Kleppe (NO)

(73) Assignee: Cubility AS, Sandnes (NO)

( * ) Notice: Subject to any disclaimer, the term of this patent is extended or adjusted under 35 U.S.C. 154(b) by 0 days.

(21) Appl. No.: 15/756,660

(22) PCT Filed: Aug. 31, 2016

(86) PCT No.: PCT/NO2016/050179
§ 371 (c)(1),
(2) Date: Mar. 1, 2018

(87) PCT Pub. No.: WO2017/039457
PCT Pub. Date: Mar. 9, 2017

(65) Prior Publication Data
US 2018/0296951 A1    Oct. 18, 2018

(30) Foreign Application Priority Data

Sep. 2, 2015 (NO) .................................. 20151127
Oct. 1, 2015 (NO) .................................. 20151291

(51) Int. Cl.
*B01D 33/04* (2006.01)
*B01D 33/048* (2006.01)
(Continued)

(52) U.S. Cl.
CPC ......... *B01D 33/048* (2013.01); *B01D 33/466* (2013.01); *B01D 33/58* (2013.01);
(Continued)

(58) Field of Classification Search
CPC ...... B01D 33/048; B01D 33/58; B01D 33/72; B01D 33/466; E21B 21/066
See application file for complete search history.

(56) References Cited

U.S. PATENT DOCUMENTS

| | | | |
|---|---|---|---|
| 6,990,768 B1 * | 1/2006 | Boston | A01M 1/02 |
| | | | 119/69.5 |
| 2003/0024869 A1 * | 2/2003 | Sebright | B01D 33/042 |
| | | | 210/400 |

(Continued)

FOREIGN PATENT DOCUMENTS

| | | |
|---|---|---|
| CN | 203060938 | 7/2013 |
| KR | 200446633 | 11/2009 |

(Continued)

OTHER PUBLICATIONS

Norwegian Search Report, Norwegian Patent Application No. 20151127, dated Mar. 10, 2016.

(Continued)

*Primary Examiner* — Chester T Barry
(74) *Attorney, Agent, or Firm* — Andrus Intellectual Property Law, LLP

(57) ABSTRACT

A device is for separating a medium comprising a mixture of a solid portion and a fluid portion. The device has a filter arrangement with a displaceable filter element having a plurality of openings that allow the fluid to be disposed through the openings while maintaining the solid portion on the filter element. The device further has an inlet for feeding the medium to the filter element and an outlet for discharging the solid portion from the filter element after that the fluid has been separated from the solid portion. The device further has an obstruction has an elastic element extending towards a surface of the filter element and adapted to contact the surface while allowing the medium to be displaced from the inlet to the outlet.

26 Claims, 10 Drawing Sheets

Figure 1:
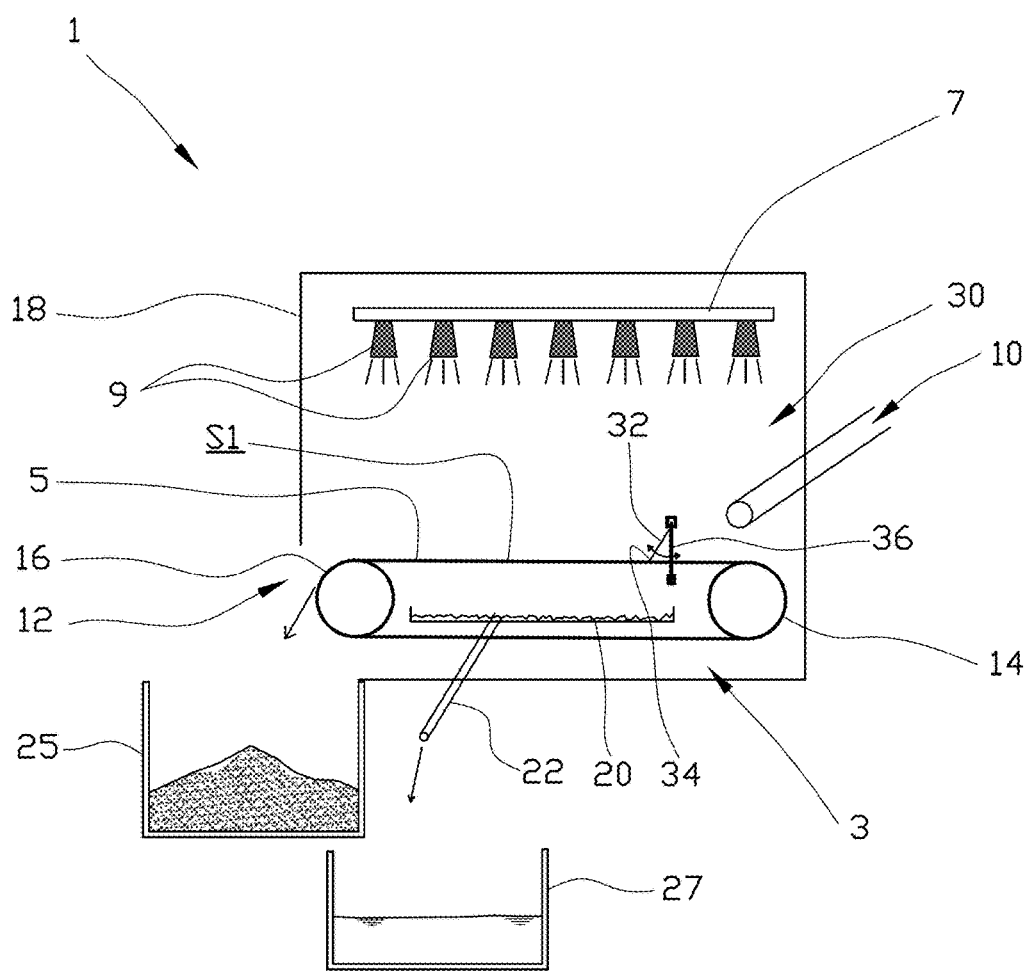

(51) Int. Cl.
*E21B 21/06* (2006.01)
*B01D 33/46* (2006.01)
*B01D 33/58* (2006.01)
*B01D 33/72* (2006.01)

(52) U.S. Cl.
CPC .......... *B01D 33/72* (2013.01); *E21B 21/065* (2013.01); *E21B 21/066* (2013.01)

(56) References Cited

U.S. PATENT DOCUMENTS

| | | | |
|---|---|---|---|
| 2008/0138512 A1* | 6/2008 | Conley | B05D 1/40 427/162 |
| 2013/0264296 A1 | 10/2013 | Mejia et al. | |

FOREIGN PATENT DOCUMENTS

| | | |
|---|---|---|
| KR | 101498428 | 3/2015 |
| NZ | 509469 | 1/2003 |
| WO | 974327 | 12/1997 |
| WO | 2006136800 | 12/2006 |

OTHER PUBLICATIONS

Norwegian Search Report, Norwegian Patent Application No. 20151291, dated Mar. 10, 2016.
International Search Report, PCT/NO2016/050179, dated Nov. 8, 2016.
Written Opinion and Reply, PCT/NO2016/050179, dated Nov. 8, 2016.
Written Opinion and Reply, PCT/NO2016/050179, dated May 11, 2017.
International Preliminary Report on Patentability and Reply, PCT/NO2016/050179, dated Aug. 14, 2017.

* cited by examiner 32,42

DEVICE FOR SEPARATING A MEDIUM COMPRISING A MIXTURE OF A SOLID PORTION AND A FLUID PORTION

CROSS-REFERENCE TO RELATED APPLICATIONS

This application is the U.S. national stage application of International Application PCT/NO2016/050179, Aug. 31, 2016, which international application was published on Mar. 9, 2017, as International Publication WO 2017/039457 in the English language. The International Application claims priority of Norwegian Patent Application No. 20151127, filed Sep. 2, 2015 and Norwegian Patent Application No. 20151291, filed Oct. 1, 2015. The international application and Norwegian applications are all incorporated herein by reference, in entirety.

The present invention relates to a device for separating a medium comprising a mixture of a solid portion and a fluid portion comprising at least a liquid. The device comprises a filter arrangement comprising a displaceable filter element comprising a surface with a plurality of openings adapted to allow the fluid to be disposed through the openings while maintaining the solid portion on the surface of the filter element. The device further comprises an inlet for feeding the medium to the filter element and an outlet for discharging the solid portion from the surface of the filter element after that the liquid has been separated from the solid portion. The separated liquid is collected and stored for possible further treatment or re-use.

In particular, the present invention relates to a device for treatment of drilling mud, such as drilling mud used in connection with drilling of a petroleum well, wherein the treatment comprises separating a solid portion and a fluid portion from each other.

By drilling fluid is meant in this document a fluid used in geotechnical engineering to aid the drilling of boreholes into the earth, typically while drilling oil and natural gas wells and on exploration drilling rigs. Drilling fluid is often called drilling mud. Two common categories of drilling fluids are water-based muds (which can be dispersed and non-dispersed) and non-aqueous muds, usually called oil-based mud.

When drilling a petroleum well, drilling fluid is continuously circulated between the borehole and the surface to remove drilled particles, also called cuttings, from the drill bit. The cuttings are carried with the drilling mud to the surface, where the cuttings are separated from the drilling mud. The drilling mud is then recirculated into the well for the drilling work.

PRIOR ART

Prior art devices for separating a medium liquid rely on separation by means of filtering with possible heating for adjusting the viscosity of the liquid. This can be done in an industrial separation facility comprising filter elements of large dimensions that are subjected to a stream of fluid. Such separation facilities are due to their dimensions for practical reason normally arranged on-shore.

In oil drilling operations, large quantities of medium in the form of drilling mud are produced. The drilling mud is in the form of a slurry comprising a mixture of solid cutting materials, such as rock, sand, etc., that comprises liquid, such as oil, drilling fluid, water, and etc. The liquid may enclose gas that also is to be separated out for further processing.

It is necessary to separate the solid cutting materials from the liquid in order to minimize the cost and the environmental impact of the drilling operation. Furthermore, certain liquids, such as drilling fluid, are expensive to replace. Accordingly, it is desirable to enable separation of the solid cutting materials from the liquid to a high degree.

To solve the above problem, special devices for in situ separation of drilling mud are available. A challenge for these devices is to enable a high degree of separation with a compact design. The devices rely on the principle of feeding the medium to the filter device and displacing the medium to an outlet while separating the liquid through the openings in the filter element. The medium is displaced from the inlet to the outlet by means of displacing the filter element. For example, the filter element may be displaced in an endless cycle or, in an alternative solution, the filter element is vibrated by means of a so-called "shale shaker" in a controlled manner that creates a displacement of the medium from the inlet to the outlet.

Accordingly, a problem with such in situ devices is to enable as high separation efficiency as possible given the constrains in size. A further problem with the prior art separation devices is that the openings of the filter element may be clogged with the medium between the inlet and the outlet. This problem is particularly pronounced for off-shore separation devices in that the space available on for example a drilling rig or vessel is very limited. Therefore, the so-called footprint of the device should be as small as possible.

The clogging of the openings results in reduced efficiency of the separation devices and in unfavourable conditions of the drilling mud, the filter element must frequently be cleaned from clogging. An examples of such unfavourable condition is when the medium comprises so called "gumbo", which is a resin-like material that is difficult to remove from the openings of the filter element. The reduced separation efficiency of the separation device may, due to such clogging, result in that the drilling operation must be reduced or temporarily interrupted.

SUMMARY OF THE INVENTION

The invention has for its object to remedy or to reduce at least one of the drawbacks of the prior art, or at least provide a useful alternative to prior art. In particular, a first object is to provide a device for separating the medium with improved efficiency in offshore conditions. A second object of the invention is to provide a device for separating the medium with reduced tendency of clogging in offshore conditions.

These objects are achieved through features, which are specified in the description below and in the claims that follow. In particular, the objects are achieved by means of a device according to claim 1. The device is characterized in that the device comprises an obstruction comprising an elastic element extending towards the surface of the filter element and being adapted to contact the surface while allowing the medium to be displaced from the inlet to the outlet.

The end portion of the elastic element is arranged to spring elastically in a direction parallel to the surface of the filter element. The elastic element simultaneously interacts with the medium and the surface of the filter element resulting in that the medium is being distributed over the surface of the filter element while the openings in the filter element are opened up by small displacements of material clogging the openings. The material clogging the openings is for example the solid portion, such as solid cutting material, certain fractions of the liquid, such as resin-like liquids, or a combination thereof.

By distributing the medium and small displacements of clogging material, more of the fluid portion comprising the liquid is allowed to pass through the openings of the filter element. Accordingly, the device of the invention enables the efficiency of the separation process to be improved for devices with constrains in size of the filter element. Furthermore, the liquid may also contain gases, which by means of the invention also can be removed with improved efficiency of the device. The obstruction extending towards the surface of the filter element effects a disturbance or "stirring" of the medium carried by the filter element, and thus facilitates liberation of any gases in the medium.

It shall be understood that filter elements with different sized openings are used in dependency of the characteristics of the medium. For example, grain size and grain size distribution of the solid portion of the medium are parameters that influences the choice of filter element. Also the properties of the liquid, such as viscosity, influences the choice of filter element.

Is shall further be understood that the elastic element, such as its dimension, may be selected in dependency of the selected filter element. The dimension of the elastic element influences the contact surface between the elastic element and the surface of the filter element. Likewise, stiffness of the elastic element is selected in dependency of the characteristic of the medium. For example, a medium comprising a liquid with low viscosity requires typically a higher stiffness of the elastic element compared to a medium comprising a higher viscosity. Certainly, further characteristics of the medium are of importance, such as ratio between the liquid and the solid portion, etc.

The elastic element is an element that springs when interacting with the surface of the filter element and the medium. Accordingly, the end portion of the elastic element is intermittent in contact with the surface of the filter element during operation of the device. When in contact with the surface of the filter element, the end portion of the elastic element acts with a contact pressure towards the surface. Accordingly, the elastic element shall be understood as an element with a high degree of elasticity that enables the end portion of the elastic element to move in respect to the surface of the filter element.

According to an embodiment of the invention, the device further comprises means for providing a stream of drive fluid through the filter element, thereby acting on the fluid with a pressure that pushes the fluid through the openings of the filter element while maintaining the solid portion on the surface of the filter element.

According to an embodiment of the invention, the elastic element comprises a brush comprising a set of bristles extending towards and in contact with the surface of the filter element. The set of bristles interacts with the surface of the filter element and the medium. Preferably, the set of bristles is spaced so that the medium can pass between two adjacent bristles.

According to an embodiment of the invention, the bristles comprise a thickness constituting 50-5000% of the size of an opening of the filter element, preferably 100-200% of the size of an opening of the filter element.

According to an embodiment of the invention, the elastic element comprises an elastic band having an end surface extending towards and in contact with the surface of the filter element.

It is to be understood that the band may also relate to a densely packed set of bristles, which provides essentially the same properties as a band in one piece. That is, when the densely packed set of bristles is arranged so that the medium essentially cannot penetrate between two adjacent bristles of the set of bristles.

According to an embodiment of the invention, the elastic band comprises a thickness constituting 50-5000% of the size of an opening of the filter element, preferably 100-200% of the size of an opening of the filter element.

According to an embodiment of the invention, the obstruction comprises a plurality of elastic elements distributed between the inlet and the outlet, and extending towards and in contact with the surface of the filter element. The plurality of elastic elements are elements such as a brushes, bands, etc., that are arranged at different positions on the surface of the filter element.

According to an embodiment of the invention, the plurality of elastic elements are for example two or more brushes, two or more elastic bands, or a combination of at least one brush and at least one band.

According to an embodiment of the invention, the plurality of elastic elements are arranged in at least one row perpendicular to an extension of the filter element between the inlet and the outlet.

According to an embodiment of the invention, the at least one row comprises two or more brushes separated from each other.

According to an embodiment of the invention, the at least one row comprises the elastic band.

According to an embodiment of the invention, the plurality of rows of elastic elements comprises a row of a first type and a row of a second type, wherein the row of a first type comprises a plurality of elastic elements separated from each other along the width of the filter element and the row of a second type comprises a single elastic element extending across the width of the filter element.

According to an embodiment of the invention, the plurality of rows of elastic elements comprises a row of a first type and a row of a second type, wherein the row of a first type comprises two or more brushes or bands separated from each other and the row of a second type comprises a single brush or band.

According to an embodiment of the invention, the device comprises at least one row of the first type and at least one row of the second type, wherein the row of the first type is arranged closer to the inlet than the row of the second type.

It has been discovered that a further improved separation efficiency of the device is obtained by a set up comprising the row of the first type closer to the inlet than the row of the second type.

It shall be understood that the device gradually separates the fluid from the solid portion as the medium is displaced from the inlet to the outlet of the device. Accordingly, ratio between the fluid and the solid portion is gradually decreasing as the medium is displaced on the filter element.

A possible reason for the improved efficiency of above arrangement may be that a row of the first type is preferable for distributing the medium and opening up the openings in the filter element when the ratio between the liquid and the solid portion is high, whereas a row of the second type is preferable when the ratio between the liquid and the solid portion is low.

According to an embodiment of the invention, the filter surface comprises a slurry area where the ratio between the fluid and the solid portion of the medium is normally equal to or above 1 and a beach area where the ratio between the fluid and the solid portion of the medium is normally below 1, wherein at least one row of the first type is positioned in the slurry area and at least one row of the second type is arranged in the beach area. By arranging the row of the first type in the area where liquid is predominant and the row of the second type in the area where solid portion is predominant, the efficiency of the device is improved further.

According to an embodiment of the invention, the device comprises at least two rows of the first type and at least one row of the second type, wherein the rows of the first type are arranged closer to the inlet than the row of the second type.

According to an embodiment of the invention, the obstruction is provided with the means for providing a stream of drive fluid or "propellant" fluid through the filter element. The obstructions provides an advantageous location for outlet of the stream of drive fluid, such as air, steam water, oil or chemicals that may be used in the drilling fluid.

According to an embodiment of the invention, the device comprises a displacement arrangement adapted to controllably displace the elastic element towards the surface of the filter element.

According to an embodiment of the invention, the displacement arrangement is adapted to gradually displace the elastic element towards the surface of the filter element during use of the device so that a contact pressure between and end portion of the elastic element and the surface of the filter element is maintained.

Due to abrasion between the elastic element and the surface of the filter element, the elastic element is gradually worn down during use of the device. In order to maintain the function of the one or more elastic elements, the displacement arrangement gradually adjusts the position of the one or more elastic elements so that the contact pressure between the elastic element and the surface of the filter element is maintained.

According to an embodiment of the invention, the displacement arrangement comprises a resilient element adapted to press the elastic element towards the surface with a certain force. The resilient element is for example a spring that pushes the elastic element towards the surface of the filter element with certain force.

According to an embodiment of the invention, the elastic element comprises a stiffness that enables the elastic element to movably interact with the medium and the surface of the filter element.

According to an embodiment of the invention, the elastic element mainly comprises a polymeric material, such as nylon, polypropylene, polyester, and combinations thereof. In particular, polypropylene is a preferable material when the device is used for separation of drilling mud in that the polypropylene withstand influence from chemicals included in the drilling fluid.

According to an embodiment of the invention, the obstruction comprises a rotatable roll provided with a plurality of elastic elements distributed along the envelope surface of the roll, wherein the and the roll is adapted to rotate by means of contact between the elastic elements and continuous displacement of the surface of the filter element.

According to an embodiment of the invention, the roll comprises rows of at least one of bands and/or brushes distributed along the envelope surface of the roll.

According to an embodiment of the invention, the roll comprises alternating rows of brushes and bands distributed along the envelope surface of the roll.

According to an embodiment of the invention, the rows of at least one of bands and/or brushes is arranged extending in an angle in respect to the axis between the top and bottom surface of the roll.

According to an embodiment of the invention, the roll is arranged in the slurry area of the filter element. The roll acts as a barrier for the medium and obstructs the movement of the medium between the inlet and the outlet. Preferably, the roll is arranged at a location on the filter element so that it acts as an embankment between the slurry area and the beach area.

According to an embodiment of the invention, the size of the openings in the filter element is in the range of 25-2000 μm, preferably in the range of 75-1000 μm.

According to an embodiment of the invention, the filter element comprises a flexible cloth that is adapted to be displaced extending between the inlet and outlet of the device.

According to an embodiment of the invention, the filter element comprises a flexible cloth arranged to be displaced in an endless loop extended between the inlet and outlet of the device.

According to an embodiment of the invention, the filter element is adapted to be displaced by controlled vibration so that the medium is displaced from the inlet to the outlet of the device.

According to an embodiment of the invention, the obstruction is adapted to enable the elastic element attached in a first orientation and a second orientation in respect to the displacement of the filter element, wherein the first orientation and the second orientation relates to opposite directions of the elastic element in respect to the displacement of the filter element.

When the elastic element is maintained in a single orientation, the elastic element may be permanently deformed in the direction of the displacement of the filter element. By reorienting the elastic element by 180 degrees between the first orientation and the second orientation, possible permanent deformation during use of the elastic element can be reverted.

DETAILED DESCRIPTION OF THE INVENTION

Figure 2:
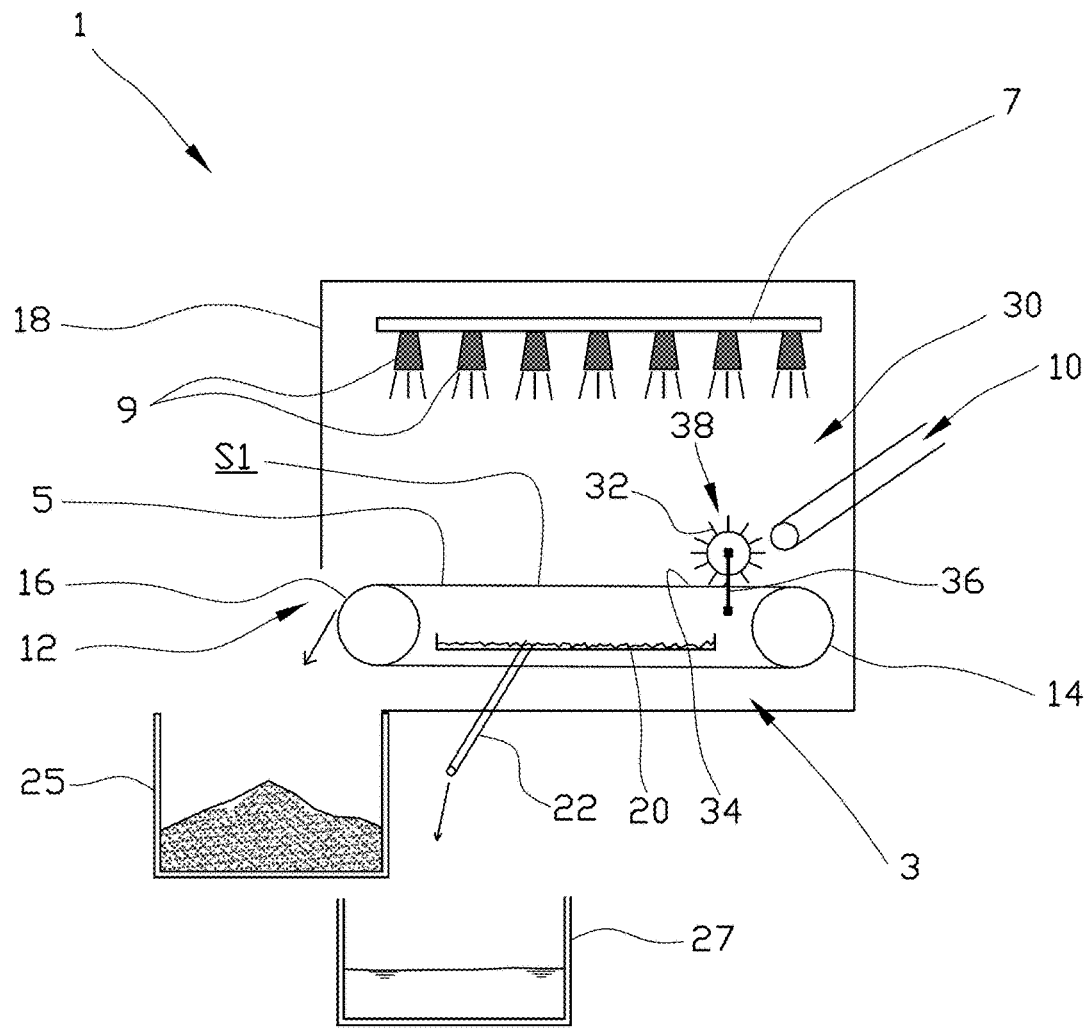
Figure 3A:
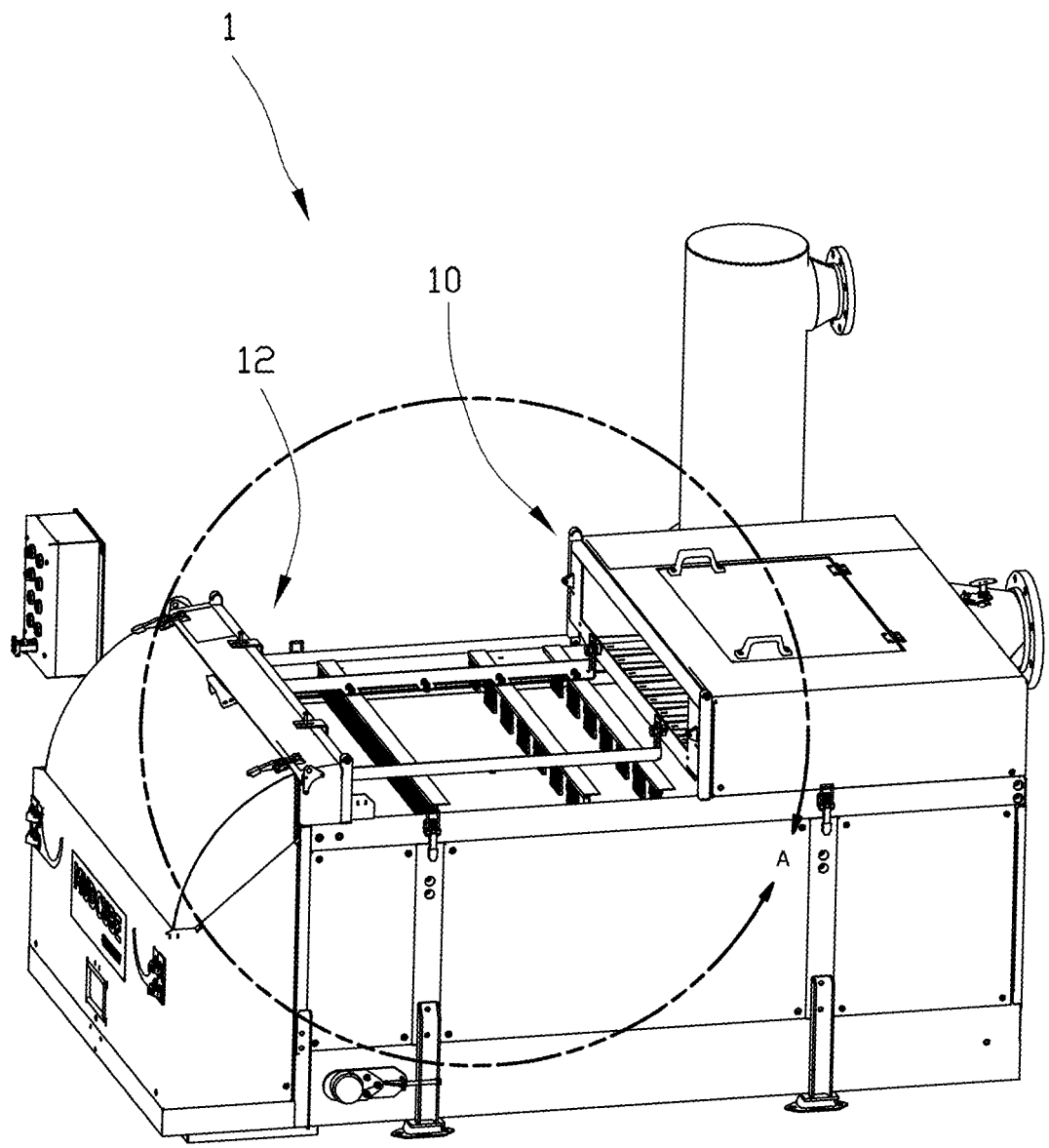
Figure 3B:
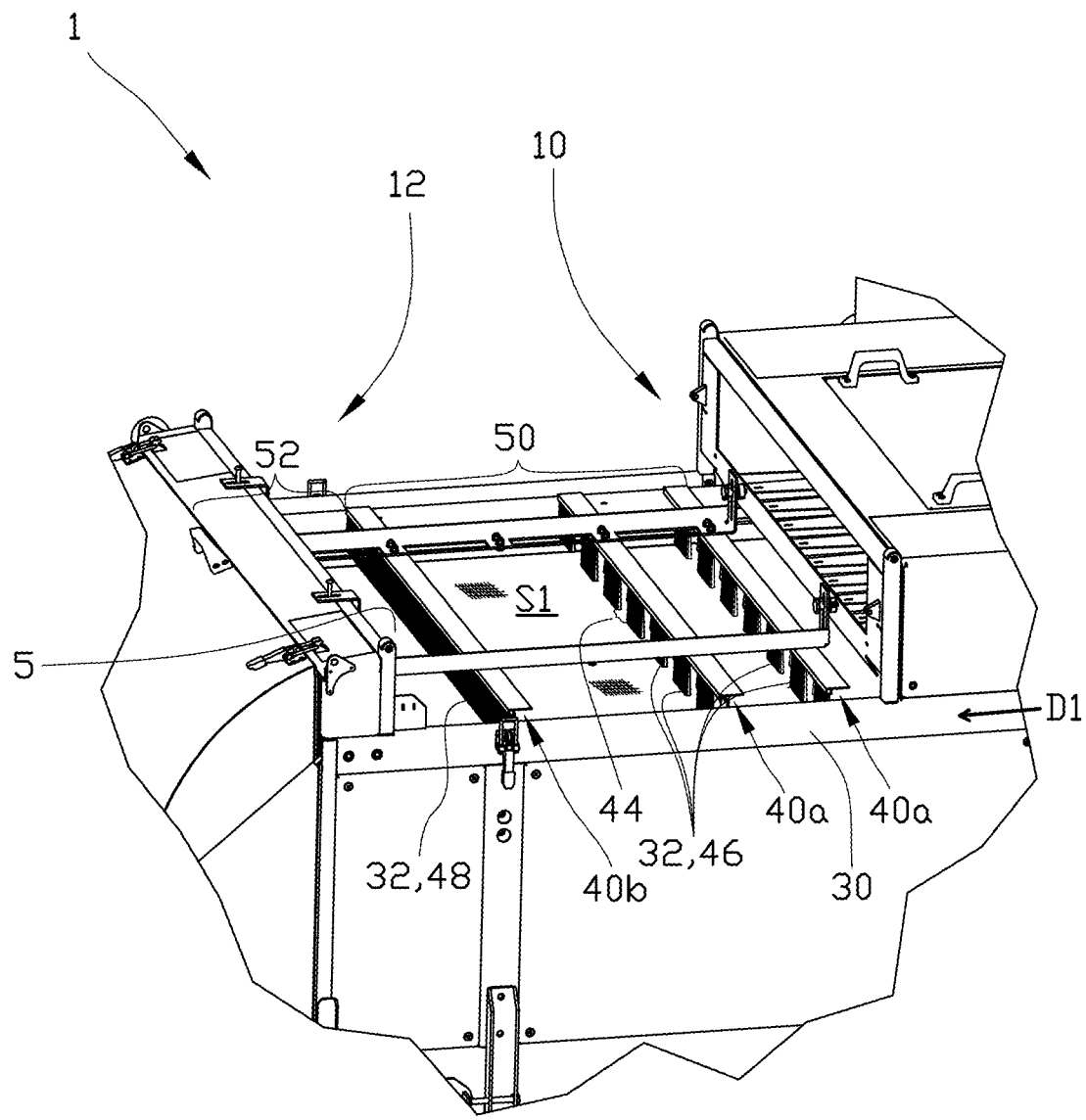
Figure 4:
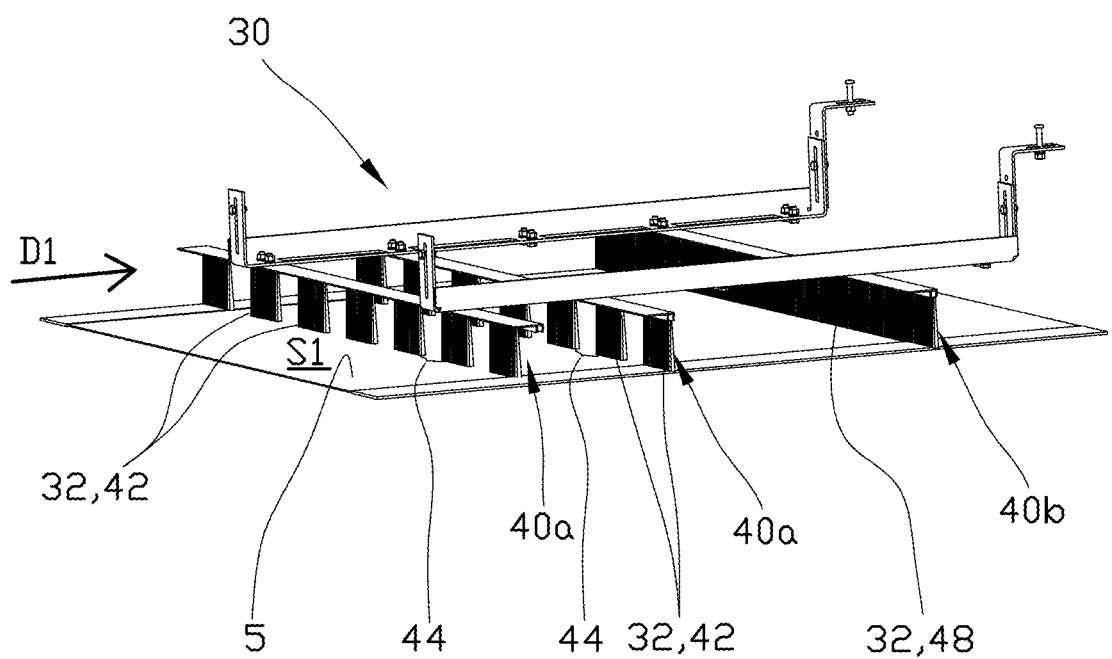
Figure 5:
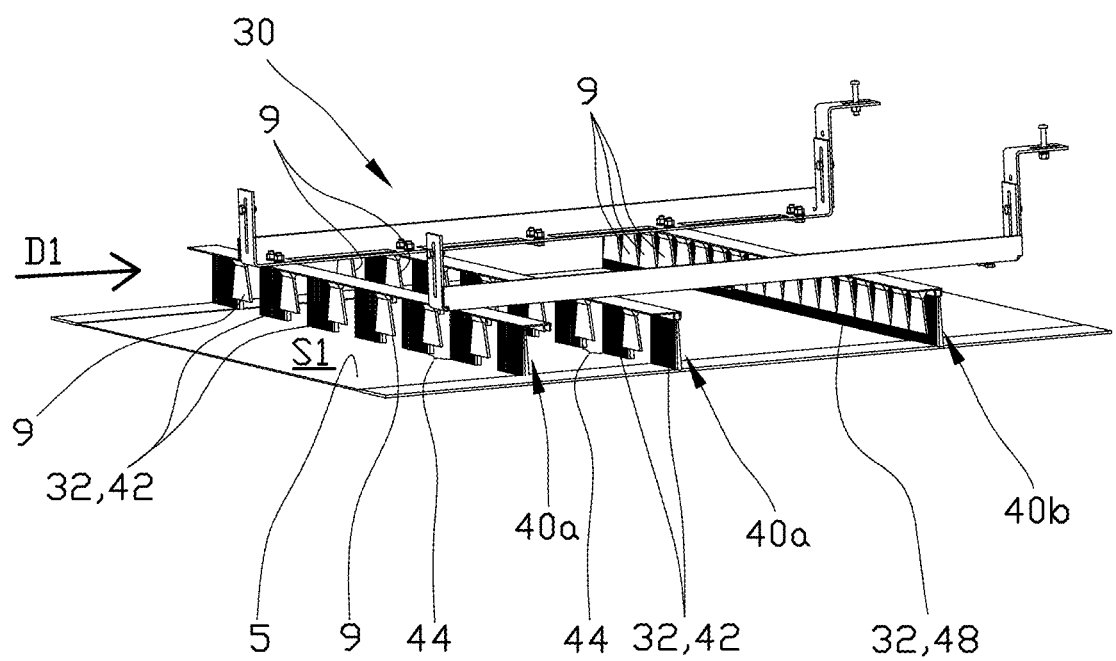
Figure 6A:
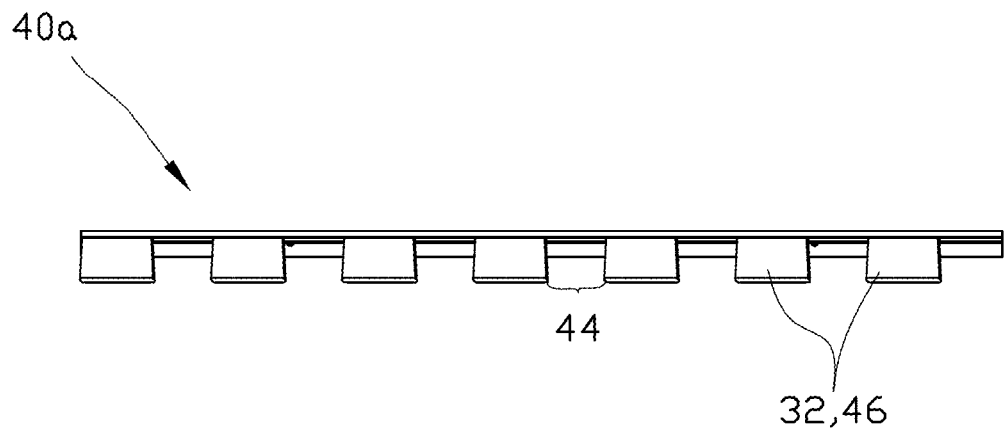
Figure 6B:
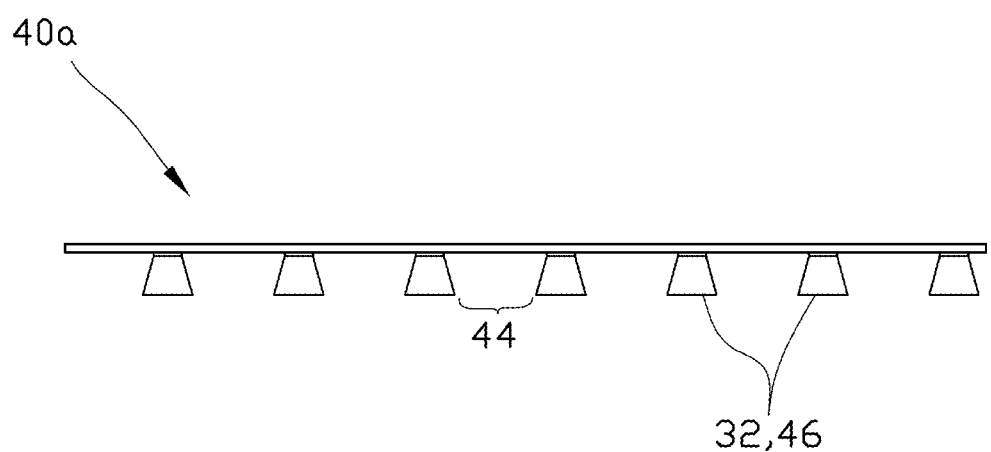
Figure 6C:
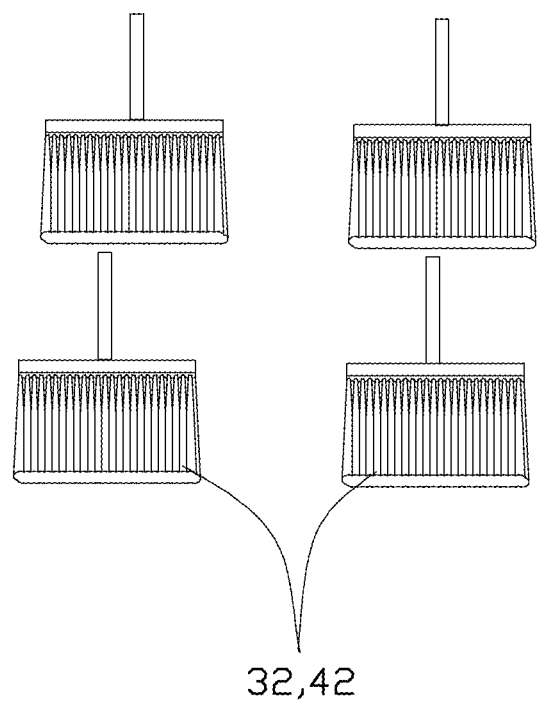
Figure 6D:
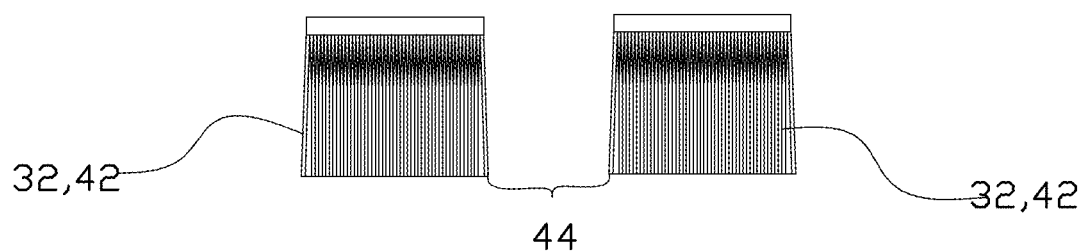
Figure 6E:
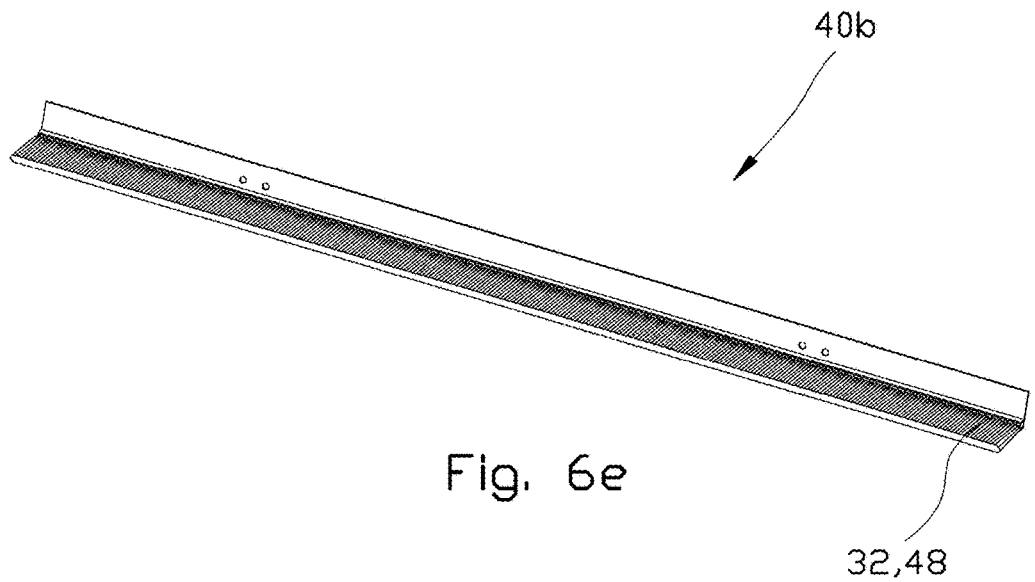
Figure 6F:
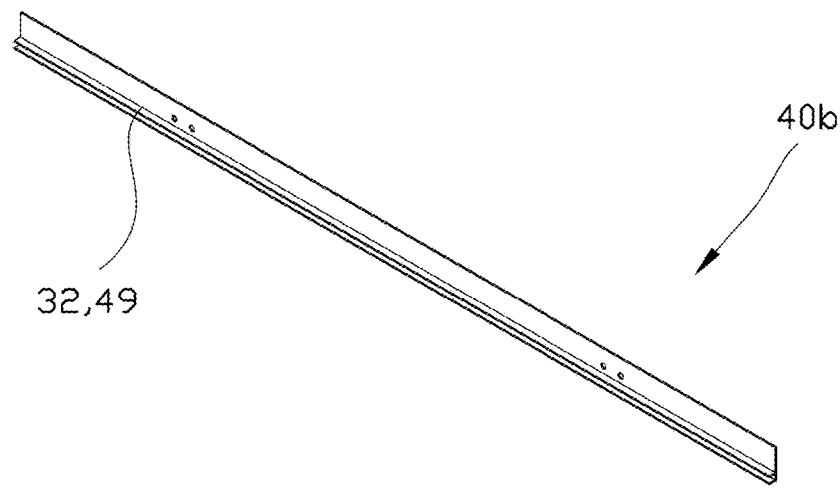
Figure 7:
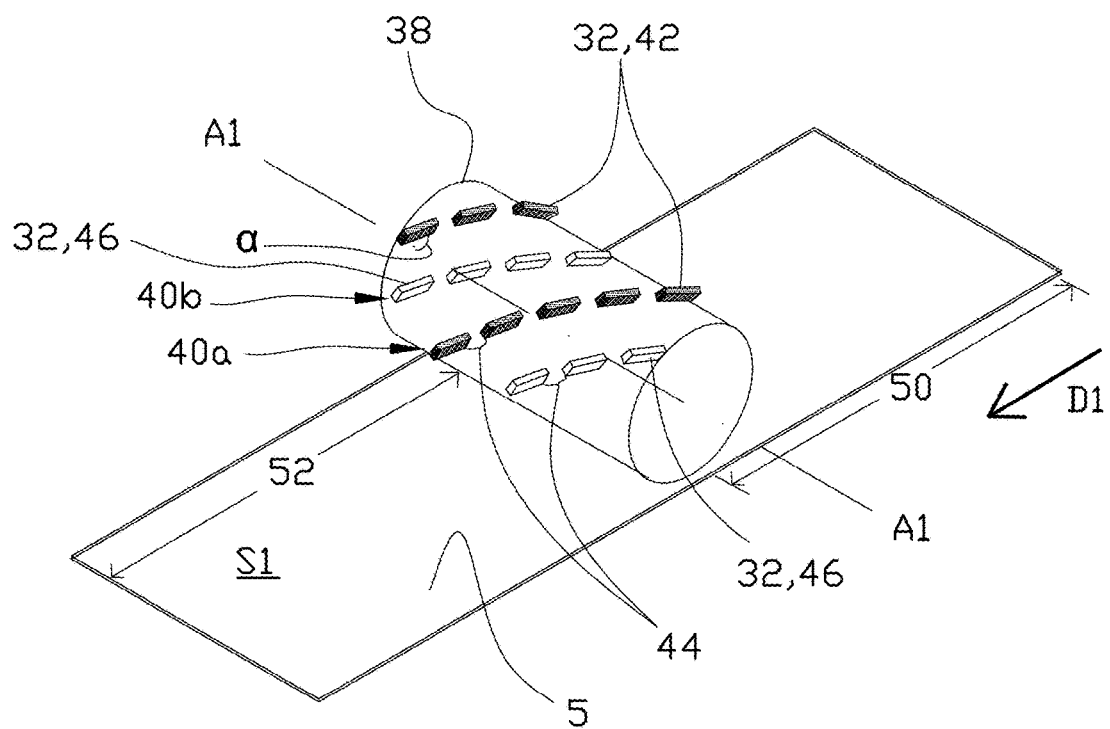

In the following is described examples of preferred embodiments illustrated in the accompanying drawings, wherein:

FIG. 1 discloses a schematic side view of a device according to a first embodiment of the invention;

FIG. 2 discloses a schematic side view of the device according to a second embodiment of the invention;

FIG. 3a discloses a perspective view of the device according to a third embodiment of the invention;

FIG. 3b discloses the device in FIG. 3a in further details;

FIG. 4 discloses a perspective view of an obstruction of the device according to a fourth embodiment of the invention;

FIG. 5 discloses a perspective view of an obstruction of the device according to a fifth embodiment of the invention;

FIG. 6a-f disclose different examples of elastic elements to be used in the device; and FIG. 7 discloses the obstruction in FIG. 2 in further details.

In FIG. 1 a first embodiment of a device 1 for separating a medium comprising a mixture of a solid portion and a fluid portion is shown, where the fluid portion of the mixture comprises at least a liquid.

The device 1 comprises a filter arrangement 3 comprising a displaceable filter element 5 and means 7 for providing a stream of drive fluid through the filter element 5, which drive fluid may be a gas, a liquid, or a combination of gas and liquid. The gas may typically be air. The liquid may typically be a base oil of the drilling fluid, other chemicals that may be used in the drilling fluid, water or a combination thereof. The means 7 for providing a stream of drive fluid comprises a plurality of outlet pipes 9 for the fluid. The device 1 further comprises an inlet 10 for feeding the medium to the filter element 5 and an outlet 12 for discharging the solid portion of the medium from the device 1.

The filter element 5 comprises a flat upper surface S1 adapted to hold the medium. The surface S1 of the filter element 5 comprises a plurality of openings that are adapted to enable the fluid portion to be separated from the solid portion when the filter element 5 is subjected to the stream of drive fluid that flows through the openings of the filter element 5. The separation of the solid and fluid portion is adapted to take place while the filter element 5 with the medium is displaced from the inlet 10 to the outlet 12.

In the disclosed embodiment, the filter element 5 comprises a flexible cloth and the filter arrangement 3 further comprises a first roll 14 and a second roll 16 for displacing the filter element 5. The filter element 5 is arranged so that it forms an endless loop. The first roll 14 and the second roll 16 are used for displacing the filter element 5 continuously in repeated cycles. The device 1 further comprises an enclosure 18 that encloses the filter arrangement 3. The arrangement of the filter element 5 in an endless loop enables a compact design of the device 1 that is suitable for being applied at on-site drilling operations.

The device 1 further comprises a channel 20 under an upper surface S1 of the filter element 5 for collecting the separated fluid portion (and any drive fluid) and guide the separated fluid portion (and any drive fluid) to a further outlet 22. In the present schematic example, the separated solid portion is discharged from the outlet 12 and is collected in a first container 25. The separated fluid portion is discharged from the channel 20 through the further outlet 22 to a second container 27.

The device 1 further comprises an obstruction 30 comprising an elastic element 32 extending towards the surface S1 of the filter element 5. In FIG. 1 a single elastic element 32 is shown. However, in the following FIGS. 2-7, different embodiments involving various configurations of a plurality of elastic elements 32 will be discussed.

The elastic element 32 is arranged extending towards the surface S1 of the filter element 5. The elastic element 32 comprises an end portion 34 that is adapted to spring in a direction essentially parallel to the surface S1 of the filter element 5 so that the elastic element 32 at least is in intermittent contact with the surface S1 of the filter element 5.

By means of the elastic properties of the elastic element 32, the end portion 34 of the elastic element 32 will during operation of the device 1 spring back and forth, which is indicated by the double arrow in FIG. 1. Accordingly, during operation of the device 1, the end portion 34 of the elastic element 32 will interact with the medium so that the medium is distributed over the surface S1 of the filter element 5. Furthermore, the end portion 34 of the elastic element 32 will interact with the surface S1 of the filter element 5 so that the openings in the filter element 5 are opened up from clogging/bridging material.

The obstruction 30 further comprises a resilient element 36, such as a spring, that acts with a force of the elastic element 32. Thereby, the elastic element 32 will be pushed towards the surface S1 of the filter element 5 so that a contact pressure between the end portion 34 of the elastic element 32 and the surface S1 of the filter element 5 will essentially be maintained. Accordingly, the resilient element 36 compensates for the wear of the elastic element 32 that occurs during operation of the device 1.

When separating drilling mud, the clogging material is for example the solid cutting material. However, also the liquid may clog the openings from optimal passage of the liquid. In unfavourable conditions, the liquid may be resin-like liquids, such as so-called "gumbo formations", that may severely clog the openings of the filter element 5.

The invention improves the separation efficiency of the device 1 by means of that the medium is distributed over the surface S1 of the filter element 5 at the same time as it is assured that the openings of the filter element 5 is removed from clogging.

In FIG. 2 a device 1 according to a second embodiment of the invention is shown. The device in FIG. 2 differs from the device in FIG. 1 in that the obstruction 30 comprises a roll 38 that is attaching a plurality of elastic elements 32 at its envelope surface. The elastic elements 32 and the surface S1 of the filter element 5 are in contact so that the roll 38 is rotated by a continuous displacement of the filter element 5 in direction from the inlet 10 to the outlet 12 of the device 1.

FIG. 3a discloses a perspective view of the device 1 according to a third embodiment, where a part of the enclosure 18 has been removed to expose the filter element 5. The device in FIG. 3a is shown in further details in FIG. 3b. The device 1 comprises an obstruction 30 comprising three rows of elastic elements 32 arranged in contact with the surface S1 of the filter element 5.

In FIGS. 3a and 3b the inlet 10 is located to the right and the outlet 12 is located to the left. Accordingly, the filter element 5 is displaced in direction D1 to the right between the inlet 10 and the outlet 12, same as in FIGS. 1 and 2. The three rows of elastic elements 32 are arranged perpendicular to the extension of the filter element 5 between the inlet 10 and the outlet 12. Accordingly, the three rows of elastic elements 32 are likewise arranged perpendicular to the direction D1 of displacement of the filter element 5.

The rows of elastic elements 32 comprise a row of a first type 40a and a row of a second type 40b. In the disclosed embodiment, the rows of elastic elements 32 comprise two rows of the first type 40a and one row of the second type 40b.

The row of the first type 40a comprises a plurality of bands 46 arranged intermittent separated from each other by separations 44. The bands 46 of the two rows of the first type 40a are furthermore positioned alternating so that the bands 46 in one row are in positions of the separations 44 between the bands 46 of the other row, and vice verse. In an alternative embodiment, the intermittent separated bands of the row of the first type 40a are replaced with brushes of corresponding dimensions.

The row of a second type 40b comprises a single brush 48, see FIG. 6e. In the disclosed embodiment, the single brush 48 extends between opposite end sides of the filter element 5. Alternatively, a single band 49 could be used, see FIG. 6f.

The device 1 is adapted to separate the solid portion from the liquid while the medium is displaced from the inlet 10 to the outlet 12. Thereby, the degree of liquid in the medium will gradually decrease as the medium is displaced from the inlet 10 to the outlet 12. Accordingly, the surface S1 of the filter element 5 can be divided in to a slurry area 50 and a beach area 52.

The slurry area 50 is located closer to the inlet 10 than the outlet 12 of the device 1. In the slurry area 50, the ratio between the liquid and the solid portion of the medium is equal to or above 1. Accordingly, in the slurry area 50, there is at least as much liquid as solid portion in the medium, and the medium is in the form of a slurry.

The beach area 52 is located further away from the inlet 10 than the slurry area 50. In the beach area 52, the ratio between the liquid and the solid portion of the medium is less than 1. Accordingly, in the beach area 50, the solid portion is in majority in the medium.

The rows of elastic elements 32 in FIGS. 3a and 3b are positioned so that the two rows of the first type 40a are located in the slurry area 50 and the row of the second type 40b is located in the beach area 52. By arranging at least one row of intermittent distributed bands 46 in the area where liquid is predominant and at least one row with the single brush 48 in the area where solid portion is predominant, the efficiency of the device 1 is improved further compared to other configurations of elastic elements 32.

FIG. 4 discloses an obstruction 30 according to a fourth embodiment of the invention. The obstruction 30 is arranged in one piece comprising two rows of the first type 40a and one row of the second type 40b. The row of the first type 40a comprises a plurality of intermittent distributed brushes 42. The row of the second type 40b comprises a single brush 48.

FIG. 5 discloses an obstruction 30 according to a fifth embodiment of the invention. The embodiment differs from the embodiment in FIG. 4 in that the obstruction comprises a plurality of output pipes 9 for drive fluid. The pipes 9 are arranged in connection with the rows of the first type 40a and the row of the second type 40b.

FIG. 6a-f disclose different examples of elastic elements 32 to be used in the device 1.

FIGS. 6a and 6b discloses a plurality of squeegee or bands 46 intermittent separated from each other and adapted to be used in the row of a first type 40a. The bands 46 are made of rubber, such as rubber used in windscreen wipers.

FIG. 6c discloses a plurality of brushes 42 to be used in the row of a first type 40a. The brushes 42 comprise bristles with short length that are intermittently separated from each other with a space 44 for passage of the medium.

FIG. 6d discloses a plurality of brushes 42 intermittently separated from each other with a space 44 and adapted to be used in the row of a first type 40a. The brushes 42 comprise bristles with long length. Each brush 42 forms a densely packed set of bristles providing similar properties of a band 46 in one piece.

FIG. 6e discloses a brush 48 to be used in the row of a second type 40b. The brush 48 comprise bristles with long length that form a densely packed set of bristles providing similar properties of a strip of band 49 in one piece. FIG. 6f discloses such a band 49 to be used in the row of a second type 40b.

The roll 38 in FIG. 2 is shown if further details in FIG. 7. The roll 38 is arranged with its axis A1 extending perpendicular to the extension of the filter element 5 and the roll 38 extends between opposite end sides of the filter element 5.

The roll 38 is provided with a plurality of elastic elements 32 distributed along the envelope surface of the roll 38. The roll 38 is adapted to rotate by means of contact between the elastic elements 32, in this embodiment brushes 42 and bands 46, and the continuous displacement of the surface S1 of the filter element 5.

The elastic elements 32 are arranged in alternating rows of a first type 40a and rows of a second type 40b. In the disclosed embodiment the rows of a first type 40a comprises a plurality of brushes 42 that are separated with a space 44. Correspondingly, the rows of a second type 40b comprises a plurality of bands 46 that are separated with a space 44. The rows of bands 46 and brushes 42 are arranged extending in an angle a in respect to the axis A1 between the top and bottom surface of the roll 38.

The roll 38 is adapted to be arranged in the slurry area 50 of the filter element 5. The roll 38 acts as a barrier for the medium and obstructs the movement of the medium between the inlet and the outlet. The roll 38 has the function of a barrier that forms an embankment between the slurry area 50 and the beach area 52. Thereby, more liquid can be separated from the solid portion given the limited surface S1 of the filter element 5.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A device for separating a medium comprising a mixture of a solid portion and a fluid portion comprising a liquid, wherein the device comprises:
   a filter arrangement comprising a displaceable filter element having a surface with a plurality of openings adapted to allow the fluid portion to be disposed through the openings while maintaining the solid portion on the surface of the filter element;
   an inlet for feeding the medium to the filter element; and
   an outlet for discharging the solid portion from the surface of the filter element;
   wherein the device further comprises an obstruction having an elastic element extending towards the surface of the filter element and being adapted to contact the surface of the filter element and simultaneously interact with the medium while the solid portion is being separated from the fluid portion when the medium is being displaced from the inlet to the outlet;
   wherein the device further comprises means for providing a stream of drive fluid through the filter element, thereby acting on the fluid with a pressure that pushes the fluid through the openings of the filter element while maintaining the solid portion on the surface of the filter element; and
   wherein the obstruction is provided with the means for providing a stream of drive fluid through the filter element.

2. The device according to claim 1, wherein the elastic element comprises a brush comprising a plurality of bristles extending towards and in contact with the surface of the filter element.

3. The device according to claim 1, wherein the elastic element comprises an elastic band extending towards and in contact with the surface of the filter element.

4. The device according to claim 1, wherein the obstruction comprises a plurality of elastic elements distributed between the inlet and the outlet, and extending towards and in contact with the surface of the filter element, wherein the plurality of elastic elements are arranged in at least one row perpendicular to an extension of the filter element between the inlet and the outlet.

5. The device according to claim 1, wherein the at least one row of elastic elements comprises two or more brushes separated from each other.

6. The device according to claim 1, wherein the plurality of rows of elastic elements comprises a row of a first type and a row of a second type, wherein the row of a first type comprises a plurality of elastic elements separated from each other along the width of the filter element and the row of a second type comprises a single elastic element extending across the width of the filter element.

7. The device according to claim 6, wherein the row of the first type is arranged closer to the inlet than the row of the second type.

8. The device according to claim 1, wherein the surface of the filter element comprises a slurry area where the ratio between the fluid and the solid portion of the medium is equal to or above 1 and a beach area where the ratio between the fluid and the solid portion of the medium is below 1, wherein the at least one row of the first type is positioned in the slurry area and the at least one row of the second type is arranged in the beach area.

9. The device according to claim 1, wherein the device comprises a displacement arrangement adapted to controllably displace the elastic element towards the surface of the filter element.

10. The device according to claim 9, wherein the displacement arrangement is adapted to gradually displace the elastic element towards the surface of the filter element during use of the device so that a contact pressure between an end portion of the elastic element and the surface of the filter element is maintained.

11. The device according to claim 9, wherein the displacement arrangement comprises a resilient element adapted to press the elastic element towards the surface with a certain force.

12. The device according to claim 1, wherein the elastic element comprises a polymeric material, such as nylon, polypropylene, polyester, and combinations thereof.

13. A device for separating a medium comprising a mixture of a solid portion and a fluid portion comprising a liquid, wherein the device comprises:
a filter arrangement comprising a displaceable filter element having a surface with a plurality of openings adapted to allow the fluid portion to be disposed through the openings while maintaining the solid portion on the surface of the filter element;
an inlet for feeding the medium to the filter element; and
an outlet for discharging the solid portion from the surface of the filter element;
wherein the device further comprises an obstruction having an elastic element extending towards the surface of the filter element and being adapted to contact the surface of the filter element and simultaneously interact with the medium while the solid portion is being separated from the fluid portion when the medium is being displaced from the inlet to the outlet; and
wherein the elastic element is one of a plurality of elastic elements distributed along the envelope surface of a roll, wherein the roll is adapted to rotate by means of contact between the elastic elements and the continuous displacement of the surface of the filter element.

14. The device according to claim 13, wherein the device further comprises means for providing a stream of drive fluid through the filter element, thereby acting on the fluid with a pressure that pushes the fluid portion through the openings of the filter element while maintaining the solid portion on the surface of the filter element.

15. The device according to claim 13, wherein the elastic element comprises a brush comprising a plurality of bristles extending towards and in contact with the surface of the filter element.

16. The device according to claim 13, wherein the elastic element comprises an elastic band extending towards and in contact with the surface of the filter element.

17. The device according to claim 13, wherein the roll comprises alternating rows of brushes and bands distributed along the envelope surface of the roll.

18. A device for separating a medium comprising a mixture of a solid portion and a fluid portion comprising a liquid, wherein the device comprises:
a filter arrangement comprising a displaceable filter element having a surface with a plurality of openings adapted to allow the fluid portion to be disposed through the openings while maintaining the solid portion on the surface of the filter element;
an inlet for feeding the medium to the filter element; and
an outlet for discharging the solid portion from the surface of the filter element;
wherein the device further comprises an obstruction having an elastic element extending towards the surface of the filter element and being adapted to contact the surface of the filter element and simultaneously interact with the medium while the solid portion is being separated from the fluid portion when the medium is being displaced from the inlet to the outlet;
wherein the obstruction comprises a plurality of elastic elements distributed between the inlet and the outlet, and extending towards and in contact with the surface of the filter element, wherein the plurality of elastic elements are arranged in at least one row perpendicular to an extension of the filter element between the inlet and the outlet; and
wherein the plurality of rows of elastic elements comprises a row of a first type and a row of a second type, wherein the row of a first type comprises a plurality of elastic elements separated from each other along the width of the filter element and the row of a second type comprises a single elastic element extending across the width of the filter element.

19. The device according to claim 18, wherein the device further comprises means for providing a stream of drive fluid through the filter element, thereby acting on the fluid with a pressure that pushes the fluid portion through the openings of the filter element while maintaining the solid portion on the surface of the filter element.

20. The device according to claim 18, wherein the row of the first type is arranged closer to the inlet than the row of the second type.

21. The device according to claim 18, wherein the surface of the filter element comprises a slurry area where the ratio between the fluid and the solid portion of the medium is equal to or above 1 and a beach area where the ratio between the fluid and the solid portion of the medium is below 1, wherein the at least one row of the first type is positioned in the slurry area and the at least one row of the second type is arranged in the beach area.

22. The device according to claim 19, wherein the obstruction is provided with the means for providing a stream of drive fluid through the filter element.

23. The device according to claim 18, wherein the device comprises a displacement arrangement adapted to controllably displace the elastic element towards the surface of the filter element.

24. The device according to claim 23, wherein the displacement arrangement is adapted to gradually displace the elastic element towards the surface of the filter element during use of the device so that a contact pressure between an end portion of the elastic element and the surface of the filter element is maintained.

25. The device according to claim 23, wherein the displacement arrangement comprises a resilient element adapted to press the elastic element towards the surface with a certain force.

26. The device according to claim 23, wherein the elastic element comprises a polymeric material, such as nylon, polypropylene, polyester, and combinations thereof.

* * * * *